US 8,627,464 B2

(12) United States Patent
Thom et al.

(10) Patent No.: US 8,627,464 B2
(45) Date of Patent: Jan. 7, 2014

(54) GLOBALLY VALID MEASURED OPERATING SYSTEM LAUNCH WITH HIBERNATION SUPPORT

(75) Inventors: Stefan Thom, Snohomish, WA (US); Nathan Ide, Bothell, WA (US); Scott Danie Anderson, Seattle, WA (US); Robert Karl Spiger, Seattle, WA (US); David J. Linsley, Seattle, WA (US); Mark Fishel Novak, Newcastle, WA (US); Magnus Nyström, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 12/938,363

(22) Filed: Nov. 2, 2010

(65) Prior Publication Data

US 2012/0110644 A1    May 3, 2012

(51) Int. Cl.
*G06F 12/14* (2006.01)
(52) U.S. Cl.
USPC ............................................. 726/22; 726/26
(58) Field of Classification Search
USPC ................. 726/2–6, 16–19, 22–23, 26–27, 34
See application file for complete search history.

(56) References Cited

U.S. PATENT DOCUMENTS

| | | | |
|---|---|---|---|
| 6,327,652 B1 | 12/2001 | England et al. | |
| 7,412,596 B2 | 8/2008 | Challener et al. | |
| 7,716,470 B2 | 5/2010 | Stillerman et al. | |
| 2004/0054901 A1* | 3/2004 | England et al. | 713/168 |
| 2004/0064457 A1 | 4/2004 | Zimmer et al. | |
| 2005/0246525 A1 | 11/2005 | Bade et al. | |
| 2006/0085630 A1* | 4/2006 | Challener et al. | 713/2 |
| 2006/0155988 A1 | 7/2006 | Hunter et al. | |
| 2007/0073416 A1 | 3/2007 | Grawrock | |
| 2008/0256595 A1* | 10/2008 | Schunter et al. | 726/1 |
| 2009/0178138 A1* | 7/2009 | Weiss et al. | 726/22 |
| 2009/0204964 A1 | 8/2009 | Foley et al. | |
| 2010/0268967 A1 | 10/2010 | Senda | |
| 2011/0145598 A1* | 6/2011 | Smith et al. | 713/190 |

OTHER PUBLICATIONS

Breeden II, John, "Two ways to fix XP's 'hibernate' security hole", Retrieved at <<http://gcn.com/Articles/2001/11/02/Two-ways-to-fix-XPs-hibernate-security-hole.aspx >>, Nov. 2, 2001, pp. 3.
"International Search Report", Mailed Date: May 7, 2012, Application No. PCT/US2011/057858, Filed Date: Oct. 26, 2011, pp. 9.

* cited by examiner

*Primary Examiner* — Ashok Patel
*Assistant Examiner* — Kevin Bechtel

(57) ABSTRACT

An event log can comprise, not only entries associated with components instantiated since a most recent power on of a computing device, but also entries of components instantiated prior to that power on, such as components that were instantiated, and represent, a state of the computing device prior to hibernation that has now been resumed. Upon hibernation, the current values of the Platform Configuration Registers (PCRs) of a Trusted Platform Module (trusted execution environment), as well as a quote of those current values, and a current value of a monotonic counter of the trusted execution environment can be logged. The monotonic counter can be incremented at each power on to track successive generations of the computing device and to guard against an intervening, not-logged generation. A subsequent parsing of the event log can verify the prior generational entries with reference to the PCR values in the log that are associated with those generations.

20 Claims, 8 Drawing Sheets

GLOBALLY VALID MEASURED OPERATING SYSTEM LAUNCH WITH HIBERNATION SUPPORT

BACKGROUND

Modern computing devices often include a Trusted Platform Module (TPM) that provides security functionality to its host computing device. The TPM, being a hardware component, can provide for increased security over that available solely through the execution of computer-executable instructions by the computing device. More specifically, the hardware of a traditional TPM is designed to protect information stored within the TPM by enabling access and modification of such information only through specific channels and specific functions, and preventing other access or modification of such information. Thus, even if a malicious entity were to gain physical access to the TPM itself, the information stored within the TPM would still remain protected, except where truly exotic and advanced forensics were applied.

One set of information that is commonly stored in a TPM are the numerical values that are stored in a TPM's Platform Configuration Registers (PCRs). These numerical values are intended to represent a current state of the computing device and are generated by extending numerical values, representing a hardware or software component that is being instantiated, into various PCRs. Thus, starting with an initial value when the computing device is powered on, the PCRs are extended with numerical values that represent hardware or software components that are successively instantiated, such that the value of the PCRs at a given time represents the state of the computing device at that time, as defined by the hardware or software components that have been instantiated, and measured into the PCRs, up to that point in time.

As indicated, the hardware of the TPM is designed such that the values of the PCRs can only be changed by the above-described extending process. Thus, the values of the PCRs cannot otherwise be modified, nor can specific values simply be stored in them. However, this design works best if the state of the computing device is represented only by components that were instantiated since the computing device was last powered on.

To conserve power, however, some computing devices have the capability of entering a "sleep" state or an even less power consuming "hibernate" state. Typically, a sleep state comprises a computing device ceasing most processing operations, as well as turning off or powering down other power consuming peripherals, such as display devices or hard disk drives. However, in a sleep state, a computing device will typically utilize power to maintain the contents of volatile memory, as well as maintain the current state of the TPM and any information stored therein, such as the values of PCRs. Consequently, when resuming from a sleep state, the state of the computing device, as reflected by both contents of volatile memory and the values of the PCR's of the TPM, can remain unchanged from when the computing device entered the sleep state.

By contrast, to conserve as much power as possible, a hibernate state typically does not provide for continued power consumption by the volatile memory of the computing device, thereby resulting in the loss of the information that was stored in the volatile memory. To preserve the contents of volatile memory, a computing device entering the hibernate state can first save the contents of volatile memory to a non-volatile storage medium. Subsequently, the computing device can enter the hibernate state, which is typically a completely powered off state, akin to the computing device being completely shut down, with the exception that the contents of volatile memory are saved on a non-volatile storage medium.

Subsequently, to resume operation, the computing device can proceed through an initial boot sequence similar to being powered on or restarted, except that, at some point in time in the initial boot sequence, the contents of volatile memory that were saved to the non-volatile storage medium can be detected, and copied back into the volatile memory, thereby enabling the computing device to resume its pre-hibernation state. However, while the computing device can resume its pre-hibernation state, at least as far as the hardware and software that has been instantiated and for which computer-executable instructions and data can have been restored into volatile memory, the PCRs of the TPM may not necessarily comprise the values that are associated with the pre-hibernation state. In particular, the copying of the saved contents back into volatile memory typically does not extend the PCRs of the TPM in the same manner as they would have been extended were the state of the computing device re-created from an initial power on or restart sequence. Consequently, the values of the PCRs may no longer correlate with the state of the computing device.

SUMMARY

In one embodiment, prior to entering a hibernation state, the current values of the Platform Configuration Registers (PCRs) can be quoted, such as by being signed with keys unique to a trusted execution environment, such as a Trusted Platform Module (TPM), and the values of the PCRs, together with the quote, can be appended to an event log that is typically maintained in volatile memory. When the contents of volatile memory are saved to a non-volatile storage medium, as is typically performed by a computing device prior to entering the hibernation state, the event log with the current values of the PCRs, and a quote thereof, can be part of the information that is saved to the non-volatile storage medium.

In another embodiment, a monotonic counter that can only be incremented and cannot be reset, such as can be typically maintained by trusted execution environments, can be utilized as a "boot counter", and can be incremented each time a computing device is "booted". The current value of the monotonic counter can be appended to the event log, along with the values of the PCRs, and the quote thereof, prior to the computing device entering the hibernation state.

In a further embodiment, upon a subsequent resuming from a hibernated state, an existing event log can be concatenated with the event log that had been saved to the non-volatile storage medium as part of the hibernation process. The resulting event log, that can be maintained in volatile memory, and appended to in a traditional manner, can comprise not only entries since the most recent resuming from the hibernated state, but also entries prior to hibernation, including the values of the PCRs prior to hibernation, the quote thereof and the value of the monotonic counter prior to hibernation.

In a still further embodiment, an event log comprising events from multiple generations or incarnations of a computing device, such as events from prior to a hibernation of the computing device and events subsequent to a resuming from hibernation, can be evaluated with reference to the current PCR values, the prior PCR values, as saved and quoted in the event log, and with reference to an incremental continuity between the current value of the monotonic counter and saved values of the monotonic counter in the event log.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which:

FIG. 2 is a block diagram of an exemplary operation of a computing device after a power on;

DETAILED DESCRIPTION

Figure 1:
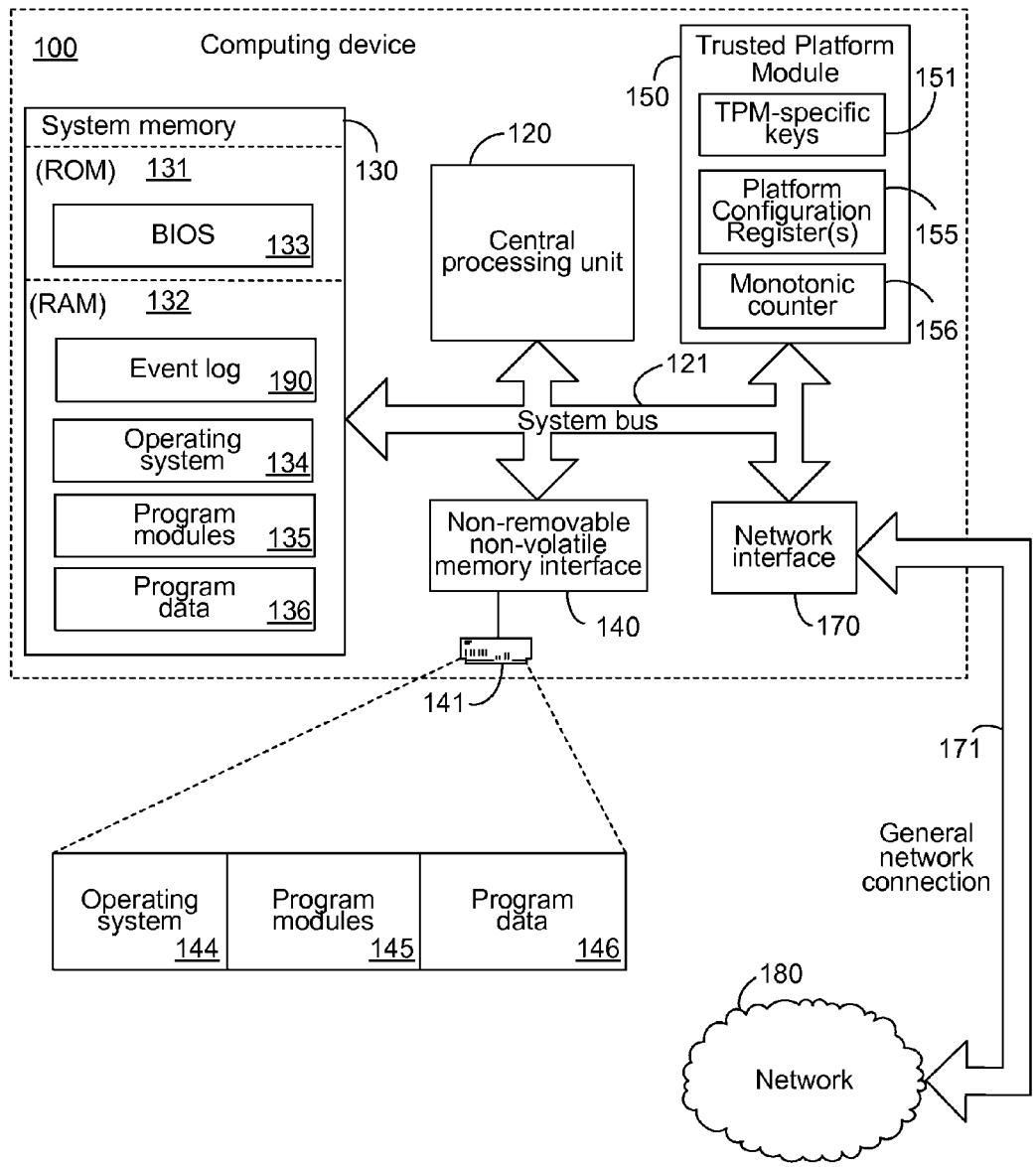
FIG. 1 is a diagram of an exemplary computing device comprising a TPM.

The following description relates to the logging, into an event log, of the values of at least some of the Platform Configuration Registers (PCRs) of a trusted execution environment, together with the value of a monotonic counter of the trusted execution environment that is being used as a boot counter, prior to the hibernation of the computing device comprising the trusted execution environment. Upon a subsequent resume, the prior event log into which this information was entered, which was saved as part of the hibernation image, can be concatenated with a current event log, thereby providing a mechanism with which to securely record the history of the computing device, at least since the most recent power on or restart.

The mechanisms described herein focus on, but are not limited to, physical computing devices entering a low power "hibernation" mode or state. Indeed, the teachings below are equally applicable to virtual computing devices that emulate the operation of a physical computing device, and can be applied, not merely across hibernate-and-resume cycles, but across any cycle in which the state of a computing device is restored without being recreated, including, for example, the distribution of state to otherwise stateless, terminal computing devices, and other like environments. As a result, the specific exemplary circumstances referenced are utilized to render the descriptions more concrete and are not meant to limit the enumerated embodiments to the specific exemplary circumstances referenced.

Additionally, the mechanisms described herein are often described with reference to a Trusted Platform Module (TPM) because such a module is well known in the art and comprises attributes that can be utilized by the mechanisms described below. However, as will be recognized by those skilled in the art, TPMs traditionally must conform to the Trusted Computing Group's (TCG's) standards and requirements for such a module and, as such, comprise features and functionality that are useless, or, at best, orthogonal to the mechanisms described herein. Thus, while reference is made to TPMs for purposes of descriptional clarity, the mechanisms described herein are equally applicable to any "trusted execution environment" that can securely provide the requisite functionality, such as a secure monotonic counter, one or more platform configuration registers that can only be modified in defined ways according to the components being instantiated by a computing device, and the ability to sign or quote information with reference to one or more securely maintained and obtained cryptographic keys. As utilized herein, the term "trusted execution environment" is meant to encompass a physical TPM conforming to the TCG standards, as well as other hardware or software modules that can securely provide the requisite functionality, such as that enumerated above and described in more detail below.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

As indicated previously, the mechanisms described herein are equally applicable to any trusted execution environment, and a hardware TPM, such as the TPM 150 shown in FIG. 1, is but one example of such a trusted execution environment. Thus, utilization of the TPM 150, described below, is not intended to limit the mechanisms described to specifically hardware TPMs conforming to the TCG specifications and is, instead intended to illustrate the mechanisms described within a specific context that can be trivially expanded to any trusted execution environment. Thus, strictly for ease of illustration, references will be made to the TPM 150 shown in FIG. 1. The TPM 150 can comprise TPM-specific keys 151 for the encryption and decryption of information provided to it. Traditionally, the TPM 150 comprises an initial set of immutable public and private encryption keys that can be utilized, in a known and established manner, to obtain disposable public and private encryption keys. For example, the TPM 150 can comprise public and private portions of an Endorsement Key (EK), one or more Attestation Identity Keys (AIKs), and other like cryptographic keys that can be utilized to variously sign, quote and encrypt and decrypt information. In addition, the TPM 150 can comprise Platform Configuration Registers (PCRs) 155 that can securely store values or other data uniquely associated with the state of the computing device 100. Such values are traditionally provided to the TPM 150 by the CPU 120 via the system bus 121. In some embodiments, only specific code executed by the CPU 120 would be permitted to send data to the TPM 150 that would modify the values stored in the PCRs 155. The TPM 150 can further comprise at least one monotonic counter, such as the monotonic counter 156. The value stored by the monotonic counter 156 can be incremented, but not decremented or assigned a specific value, as such actions can be prevented by the TPM 150. In one embodiment, once the value of the monotonic counter 156 exceeds a certain threshold, it can roll over to an initial value and can be incremented further from there.

In addition to the elements described above, the computing device 100 also typically includes computer readable media, which can include any available media that can be accessed by the computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by the processing unit 120. By way of example, and not limitation, FIG. 1 illustrates operating system 134, other program modules 135, and program data 136 as being resident in the RAM 132. The RAM 132 can also comprise data that can be relevant to the operation of the TPM 150, such as the event log 190. In one embodiment, the event log 190 can comprise a unique identification of all of the modules loaded or executed by the computing device 100 since power was applied or since it was last restarted; the same modules whose loading or execution can have resulted in the values currently maintained by the TPM 150 in one or more PCRs 155. For example, the event log 190 can be a Trusted Computing Group (TCG) event log.

The computing device 100 may additionally include other removable/non-removable, volatile/nonvolatile computer storage media. By way of example only, FIG. 1 illustrates a hard disk drive 141 that reads from or writes to non-removable, non-volatile magnetic or solid-state media. Other removable/non-removable, volatile/nonvolatile computer storage media that can be used with the exemplary computing device include, but are not limited to, solid-state based storage devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies.

In one embodiment, the "state" of the computing device 100 can be defined by the hardware components, such as those described above, and the components of computer-executable instructions, also such as those described above, that have been instantiated, or otherwise activated, since the computing device 100 was powered on or restarted. From a security perspective, the state of the computing device 100 at a time prior to the application of power and prior to the initialization of any hardware, or the execution of any computer-executable instructions, can be regarded as a "safe" state. Consequently, from a security perspective, whether any subsequent state of the computing device 100 is secure can be determined via examination of the changes made to the computing device 100 from the moment when power was applied, or reapplied after a restart. Thus, as will be known by those skilled in the art, one function of the event log 190 is to provide a record of all of the relevant hardware components and components of computer-executable instructions that have been instantiated on the computing device 100 since power was applied. If each of the elements listed in the event log 190 are believed to be safe, then the current state of the computing device 100 can likewise be deemed to be safe, since the computing device can be deemed to have not departed from its initial safe state. Conversely, and more practically, if any one of the elements listed in the event log 190 is believed to be a security concern, then the state of the computing device 100 can be determined to no longer be safe and, as a result, the computing device 100 can be prevented from performing certain security-sensitive operations, such as, for example, joining a secure network, or accessing protected data.

However, as will also be known by those skilled in the art, the event log 190, being retained in the RAM 132, can be accessed and modified and, as a result, cannot be assured to be an accurate representation of all of the relevant hardware components and components of computer-executable instructions that have been instantiated on the computing device 100 since power was applied. To protect against such tampering of the event log 190, the PCRs 155 of the TPM 150 are utilized to retain values associated with the entries in the event log 190 such that if the values of the PCRs 155 do not correspond to the entries in the event log 190, a determination can be made that the event log 190 may have been tampered with and no longer represents an accurate listing of the relevant hardware components and components of computer-executable instructions that have been instantiated on the computing device 100 since power was applied. In particular, and as will also be known to those skilled in the art, each entry in the event log 190 can correspond to a particular hardware component or components of computer-executable instructions that can be measured, such as by computing a hash of the relevant-computer executable instructions, or otherwise deriving a unique numerical value that represents that component. As each component is instantiated, this unique numerical value can be extended into one or more of the PCRs 155 via known mathematical operations that receive, as input, the prior value of the one or more PCRs 155 and the unique numerical value that is being extended into them, and derive therefrom a subsequent numerical value that is stored back into the one or more PCRs 155. Consequently, the current value of the PCRs 155 should be obtainable by performing such an extend operation with the unique numerical values associated with each of the entries in the event log 190, in the order of those entries in the event log 190. If the values obtained from the entries in the event log 190 do not match those maintained in the PCRs 155, the above conclusion that the event log 190 is no longer accurate can be reached.

Figure 2:
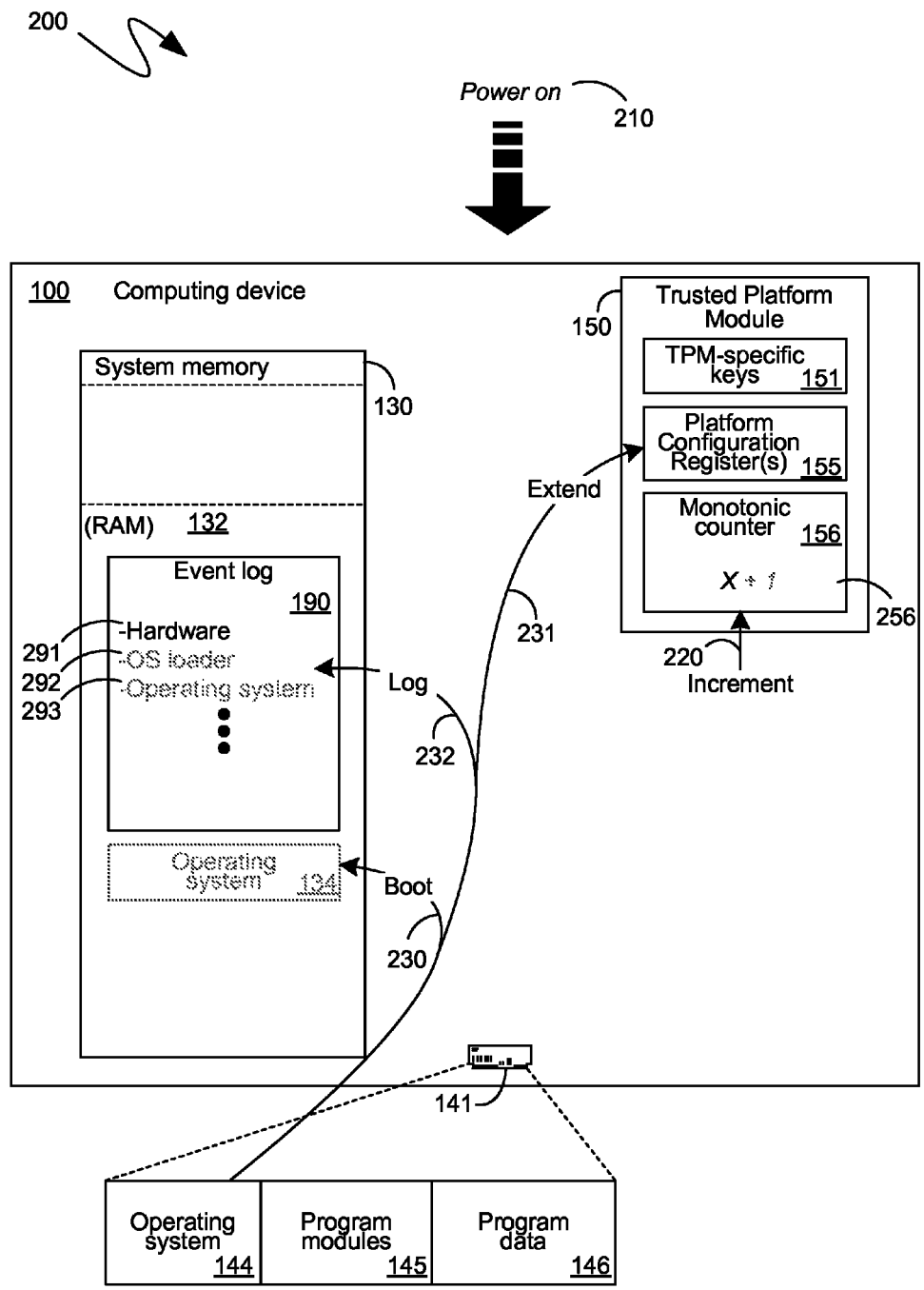

Turning to FIG. 2, the system 200 shown therein illustrates an exemplary series of operations in accordance with the above descriptions, that also provide a foundation for the descriptions below. As can be seen from the system 200, a power on event 210 can be applied to the computing device 100, thereby causing the computing device 100 to commence initializing, or otherwise instantiating, various hardware components, and also to commence executing computer-executable instructions, such as the operating system 144 that is stored on the hard disk drive 141 of the computing device 100. For example, as shown in the system 200 of FIG. 2, the operating system 144, that is stored on the hard disk drive 141, can be booted, or otherwise instantiated, as illustrated by the boot action 230. As will be understood by those skilled in the art, the process of instantiating the operating system 144 can result in the creation of the operating system 134 as an executing process that stores information in the RAM 132. Consequently, the boot action 230 is illustrated in FIG. 2 as transferring information from the operating system 144, as stored on the hard disk drive 141, to the RAM 132, in the form of the operating system 134, which is illustrated in gray to indicate that, as of the commencement of the boot action 230, the operating system 134 does not yet fully exist within the RAM 132.

As each component of the computing device 100 is instantiated, an appropriate entry can be added to the event log 190. Thus, as illustrated by the log action 232, shown in the system 200 of FIG. 2, entries for the instantiation of the operating system 144, such as the exemplary OS loader entry 292 and the exemplary operating system entry 293 can be added to the event log 190. In one embodiment, such entries 292 and 293 can be added either before or after the entries for the hardware that was instantiated prior to the operating system 144, such as the hardware entry 291, depending on whether the event log 190 is organized in a first-on-top or a first-on-bottom order. As will be recognized by those skilled in the art, typical entries in an event log 190 can comprise more detail, and can be more finely delineated. However, the entries 291, 292 and 293 are shown in the event log 190 purely for illustrative purposes.

In addition to the logging action 232, the instantiation of the operating system 144 can result in one or more extend operations, such as the extend action 231, that can extend one or more of the PCRs 155 with measurement values of some or all of the components of the operating system 144 that correspond to the entries 292 and 293 in the event log 190. In such a manner, the computing device 100 can proceed through its booting sequence and can, optionally, instantiate further computer executable instructions, such as those that comprise program modules 145, including logging the appropriate entries in the event log 190 and extending one or more of the PCRs 155 with appropriate measurement values.

In one embodiment, a monotonic counter 156 of the trusted platform module 150 can be utilized as a "boot counter" such that it can be incremented, as indicated by the increment action 220, each time the computing device 100 is booted, including, for example, being powered on, such as illustrated in the system 200 of FIG. 2, being restarted, or being resumed from hibernate state. As utilized herein, the term "powered on" means the application of power to a computing device after an extended period of time in a mechanical power off state, such as that defined as the "G3" state in the Advanced Configuration and Power Interface (ACPI) specification. Conversely, the term "restart", as utilized herein, means the application of power to a computing device as part of an automated cycle through a power off state, such as can be initiated by selecting a "restart" option common in many operating systems. The term "resume", as utilized herein, means the application of power after a computing device has entered a hibernation state, such as that defined by the "S4" state of the ACPI specification. Returning back to FIG. 2, the value 256 of the monotonic counter 156 can be an increment greater than the prior value, represented by the variable "x" in the figure, to account for the illustrated booting of the computing device 100. Additionally, while the illustration in FIG. 2 shows an increment step of one, other incrementation values can be utilized.

Figure 3:
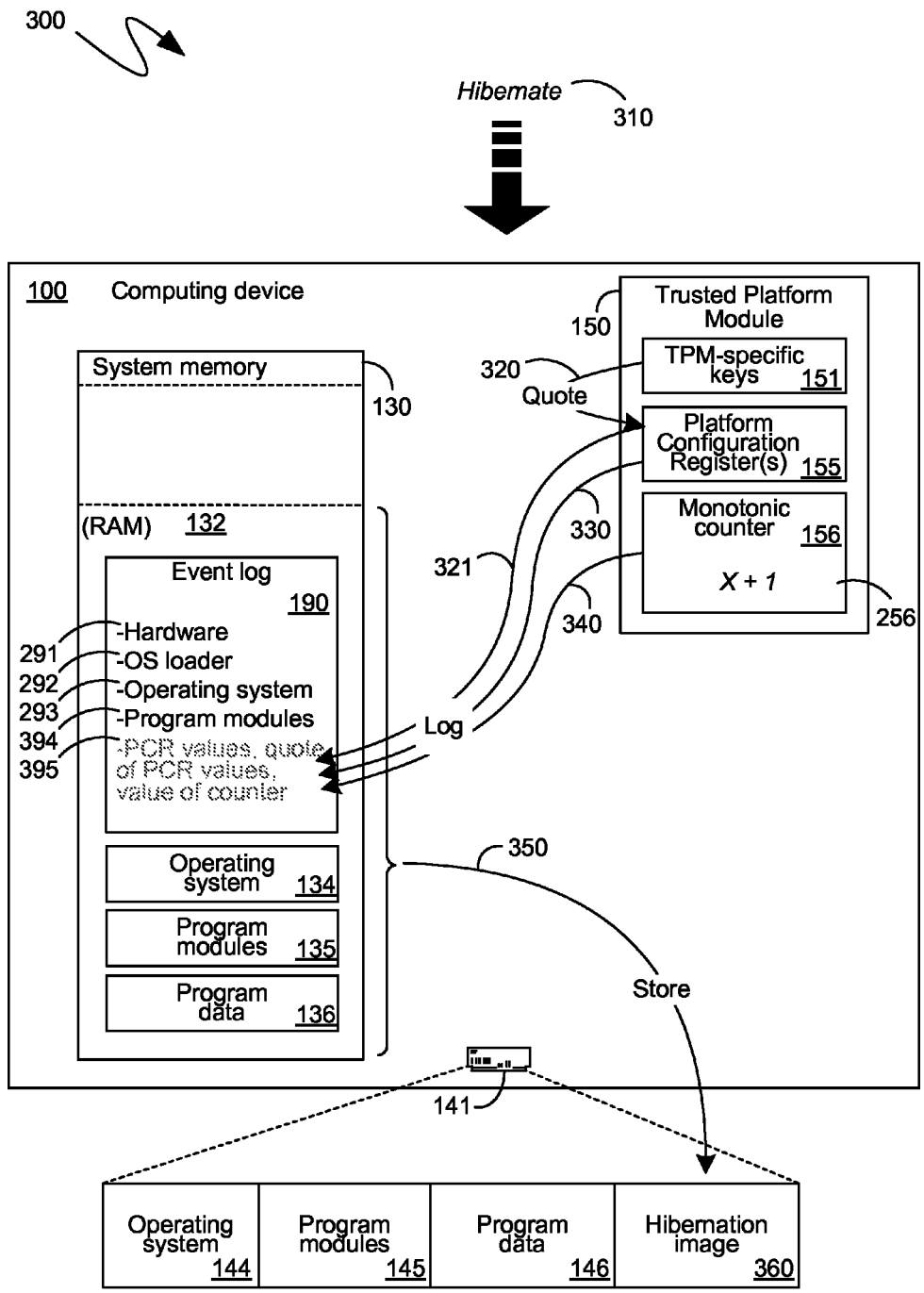
FIG. 3 is a block diagram of an exemplary operation of a computing device prior to a hibernate.

Turning to FIG. 3, the system 300 shown therein illustrates the computing device in a state after it has been booted and utilized. Thus, in the illustrated example shown in FIG. 3, the event log 190 can comprise further entries to those described previously including, for example, entry 394 referencing one or more program modules, or other components of computer-executable instructions.

As shown in the system 300 of FIG. 3, a hibernate instruction 310 can be provided to the computing device 100 that can cause the computing device to store the contents of the RAM 132, or at least some portion thereof, on a volatile storage medium, such as the hard disk drive 141, as a hibernation image, such as the hibernation image 360. Such an action is represented by the store action 350 in FIG. 3.

In one embodiment, prior to creating the hibernation image 360, one or more additional entries can be logged into the event log 190. In particular, as illustrated by the quote action 320, one or more of the TPM-specific keys 151 can be utilized in a manner well known to those skilled in the art to quote the current values of one or more of the PCRs 155. For example, an AIK can be utilized to sign the values of one or more of the PCRs 155. Such a process can prove that the values of the one or more PCRs 155 that are quoted were, in fact, in existence on the computing device 100 at the time that they were quoted.

Subsequently, as illustrated by the logging action 321, this quote of the PCRs 155 can be appended to the event log 190 as illustrated by the entry 395. In addition, the entry 395 can further comprise the values of the PCRs 155 themselves, as illustrated by the logging action 330, such that the quote provides proof that the values of the PCRs 155 that are part of the entry 395 have not been tampered with or otherwise modified. In one embodiment, the entry 395 can further comprise the current value 256 of the monotonic counter 156, as illustrated by the logging action 340. As will be recognized by those skilled in the art, while the values of the PCRs 155, the quote of the values of the PCRs 155 and the value 256 of the monotonic counter 156 are shown in FIG. 3 as being logged into the event log 190 as a single entry 395, such an illustration is merely an example and is simplified for illustrative clarity. In other embodiments, one or more of those pieces of information can be logged individually or via multiple entries in the event log 190.

The logging actions 321, 330 and 340 can occur prior to the creation of the hibernation image 360, by the store action 350. As a result, the entry 395 can be part of the event log 190 when the event log 190 is saved on a non-volatile storage medium, such as the hard disk drive 141, in the hibernation image 360. As will be known by those skilled in the art, once the hibernation image 360 has been saved, and the computing device 100 has performed other relevant hibernation-centric functions, it can proceed to hibernate, and the contents of the RAM 132 can be lost as the computing device 100 can enter, essentially, a powered off state. While the logging actions 321, 330 and 340 are shown as occurring within the context of a hibernation of the computing device 100, they need not occur temporally close to such a hibernation event. For example, in one embodiment, the logging actions 321, 330 and 340 can be performed at any time during the operation of the computing device 100 including, for example, soon after the computing device 100 has completed booting.

Figure 4:
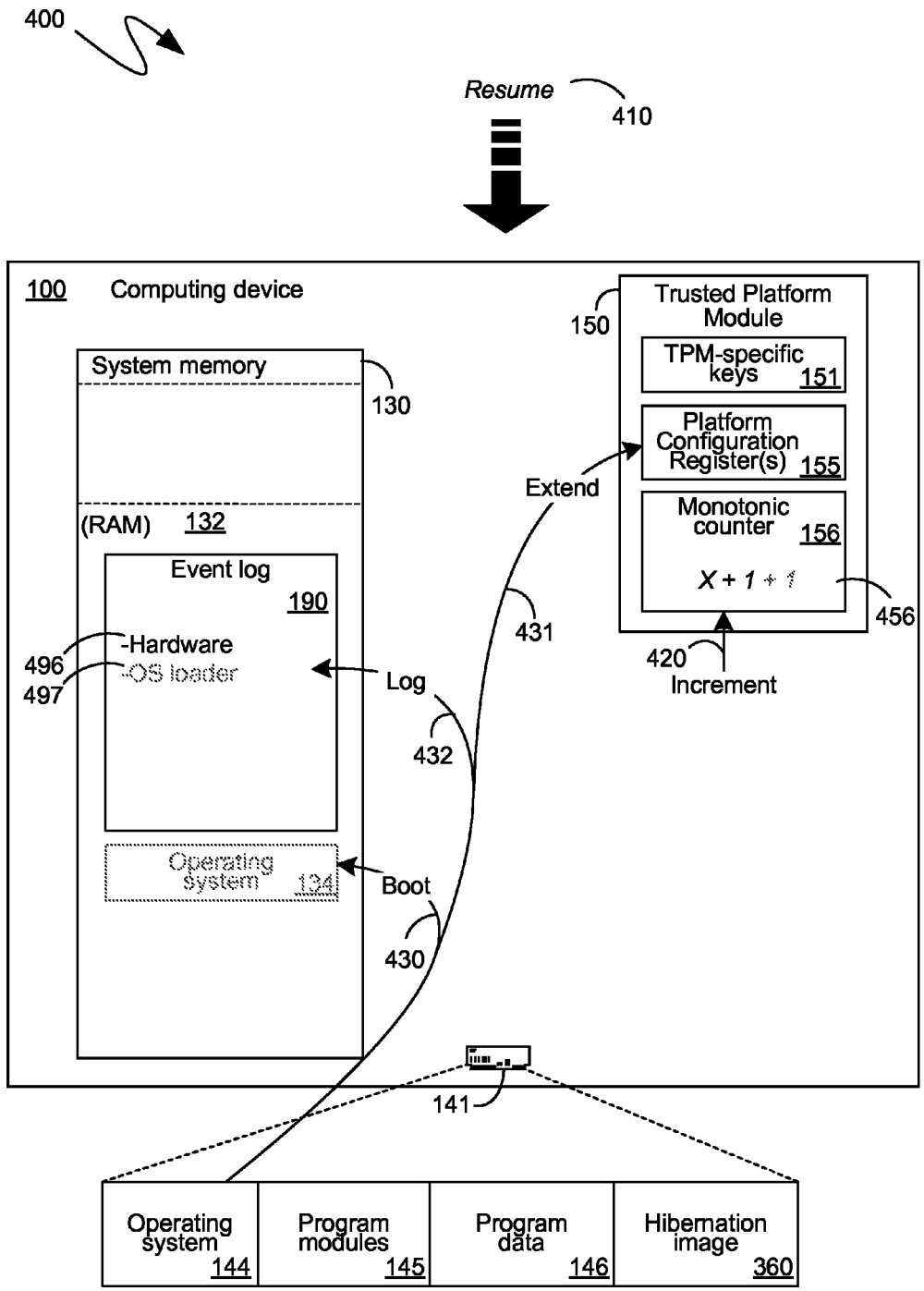
FIG. 4 is a block diagram of an exemplary operation of a computing device after a resume from hibernation.

Turning to FIG. 4, the system 400 shown therein illustrates the computing device 100, comprising the hibernation image 360, being resumed from a hibernated state. Initially, a resume action 410, can be applied to the computing device 100 by, for example, depressing a power button or other like user action. Subsequently, the computing device 100 can proceed through a boot sequence analogous to that described above with reference to the system 200 of FIG. 2. Thus, as shown in the system 400 of FIG. 4, the operating system 144 can be booted, as illustrated by the boot action 430, to generate an in-memory operating system 134, and the relevant components of the operating system can both be logged into the event log 190, as illustrated by the logging action 432, and their measurements can be extended into one or more of the PCRs 155, as illustrated by the extend action 431. In addition, as also described previously, the monotonic counter 156 can be incremented, as shown by the increment action 420 in the system 400 of FIG. 4. The resulting value 456 of the monotonic counter 156 can be a single increment unit greater than the prior value 256 of the monotonic counter 156.

Typically, however, once an OS loader, or other relevant component of the operating system 134, detects the presence of the hibernation image 360, the traditional booting of the computing device 100 can be suspended, and the hibernation image 360 can be restored to the RAM 132. Thus, as shown in the system 400 of FIG. 4, the event log 190 may not comprise anything more than entries for the instantiated hardware, such as the entry 496, and entries for the OS loader, or other relevant components of the operating system 134, such as the entry 497, before the hibernation image 360 is restored to the RAM 132.

Figure 5:
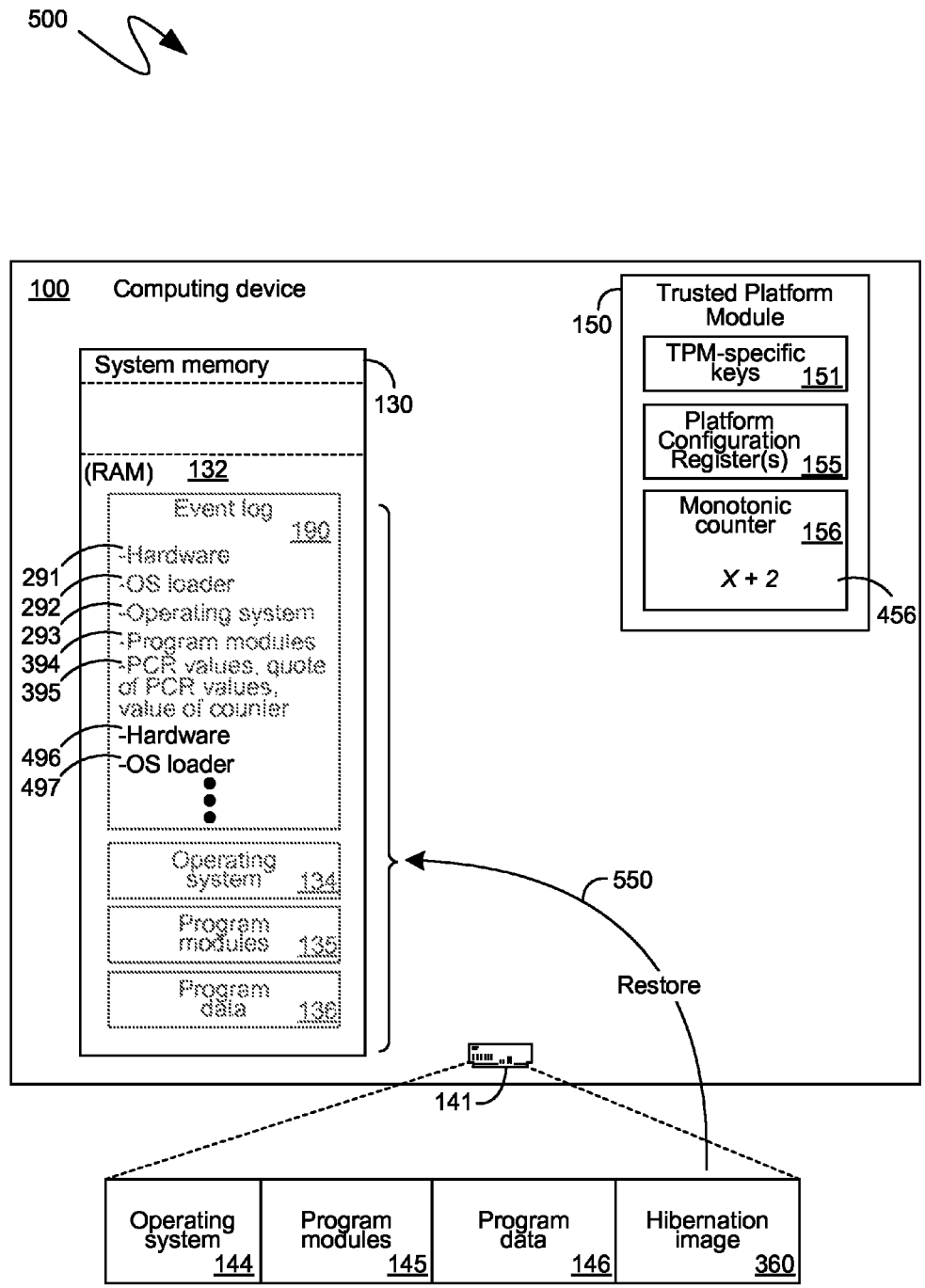
FIG. 5 is a block diagram of a further exemplary operation of a computing device after a resume from hibernation.

Turning to FIG. 5, system 500 shown therein illustrates one exemplary restoring of the hibernation image 360 to the RAM 132. As illustrated by the restore action 550, the restoring of the hibernation image 360 to the RAM 132 can return, to the RAM 132, the operating system 134, the program modules 135 and the program data 136 that were previously stored thereon prior to the hibernation of the computing device 100. As will be recognized by those skilled in the art, the restoring of the contents of RAM 132 can enable the computing device 100 to recommence with the operations that it was performing prior to being hibernated. However, as will also be recognized by those skilled in the art, the restore action 550 may not affect the PCRs 155. Thus, the values of the PCRs 155 may reflect, for example, the state of the computing device 100 immediately prior to the restoring of the hibernation image 360, as opposed to the actual state of the computing device, which is more analogous to that shown in the system 300 of FIG. 3.

However, as part of the restore operation 550, the event log 190 can be modified to comprise both the information that was in the event log 190 as it was saved in the hibernation image 360 and is now being restored to RAM 132, such as the entries 291, 292, 293, 394 and 395, and to further comprise information that was added to the event log 190 since the most recent powering on of the computing device 100 to resume it from the hibernated state, such as the entries 496 and 497.

As such, the event log 190 can comprise sufficient information to accurately assess the security state of the computing device 100. In particular, the components that were previously instantiated, and which impacted the state of the computing device 100 prior to hibernation, which was now restored, can be represented in the event log 190, such as via the entries 291, 292, 293 and 394. Additionally, the components that were currently instantiated, and which can impact the current state of the computing device, can likewise be represented in the event log 190, such as via the entries 496 and 497. The current entries of the event log 190 can be validated with reference to the current value of one or more PCRs 155, in a manner known to those skilled in the art, while the prior entries of the event log 190 can be validated with reference to the prior value of one or more PCRs 155 that were stored into the event log 190, such as part of the entry 395. The quote of that prior value of one or more PCRs 155 can be utilized to ensure that the values stored in the event log 190 had not been modified.

In addition, a comparison between the current value 456 of the monotonic counter 156 and one or more prior values 256 of the monotonic counter 156, such as those that can be part of the entry 395, can reveal if the computing device was booted in the interim without appropriate information being logged to the event log 190. For example, if the prior value 256 of the monotonic counter 156 that is part of the entry 395 is incrementally continuous with the current value 456 of the monotonic counter 156, then a determination can be made that the computing device was not otherwise booted between the prior boot, which resulted in the state of the computing device that was hibernated, and the current boot, which resulted in that state being resumed.

Figure 6:
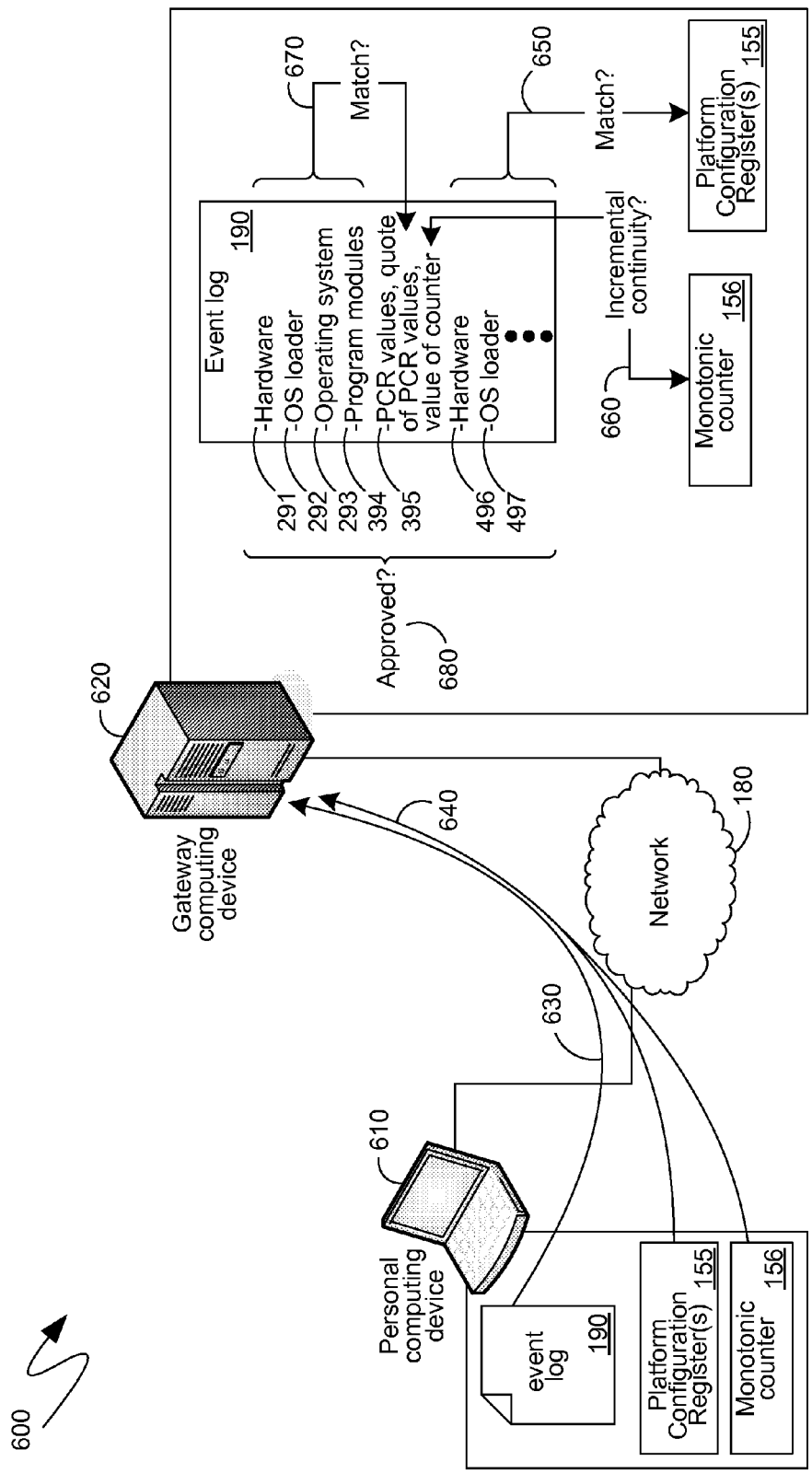
FIG. 6 is a block diagram of an exemplary examination of an event log.

Turning to FIG. 6, the system 600 shown therein illustrates one exemplary utilization of the above described mechanisms. In the system 600 of FIG. 6, the personal computing device 610 can be a computing device that has gone through a similar sequence of steps to those described in detail above with reference to the exemplary computing device 100. As such, the personal computing device 610 can comprise the event log 190, the PCRs 155 and the monotonic counter 156. Additionally, the gateway computing device 620 can likewise share the general hardware and software described with reference to the exemplary computing device 100, such as with reference to FIG. 1.

In one embodiment, the personal computing device 610 and the gateway computing device 620 can be communicationally coupled via the network 180, and the personal computing device 610 can be attempting to gain access to some data or resource that is protected by the gateway computing device 620. In such an embodiment, the gateway computing device 620 can grant the personal computing device 610 the access it is requesting, if the gateway computing device 620 can determine that the personal computing device 610 is not malicious. To that end, the personal computing device 610 can, in a manner known to those skilled in the art, make available its event log 190, and the values of its PCRs 155 and monotonic counter 156 to the gateway computing device 620, as illustrated by the communications 630 and 640 shown in the system 600 of FIG. 6. The gateway computing device 620 can then parse the event log 190 to determine whether the personal computing device 610 has instantiated any component that may be malicious, or otherwise unacceptable given the conditions of access that the gateway computing device 620 is enforcing.

In addition to parsing the event log 190, the gateway computing device 620 can further verify that the information on which it is basing its decision, namely the entries in the event log 190, are accurate, and have not been modified, or otherwise tampered with. To that end, the gateway computing device 620 can verify, as illustrated by the action 650, that the values of the PCRs 155 are equivalent to the values that would be obtained if the measurements of the components listed in the event log 190 since the most recent boot, such as the entries 496 and 497, were extended into the PCRs 155. For entries in the event log 190 prior to the most recent boot, the gateway computing device 620 can verify, as illustrated by the action 670, that the prior values of the PCR's 155, as contained in the entry 395, are equivalent of the values that would be obtained if the measurements of the components listed in the event log as occurring prior to the most recent boot, such as the entries 291, 292, 293 and 394, were extended into the PCRs 155. Additionally, although not specifically shown, the gateway computing device 620 can verify that the prior values of the PCRs in the entry 395 have not been modified, or otherwise tampered with, by referencing the quote of those values that is also part of the entry 395, or is otherwise contained in the event log 190. Furthermore, to ensure that the personal computing device 610 has not otherwise been booted in between the boots recorded in the event log 190, the gateway computing device 620 can, as illustrated by the action 660, verify that there is incremental continuity between the value of the monotonic counter 156 that was stored in the event log 190, such as in the entry 395, and the current value of the monotonic counter 156. If all such checks are verified, the gateway computing device 620 can proceed to parse the event log 190 and verify that each of the components enumerated therein is approved, or, otherwise to verify that at least each of the components enumerated therein is not known to be malicious. As indicated by the action 680, such an examination of the entries of the event log 190 can, in one embodiment, form the basis of the decision, by the gateway computing device 620, of whether to grant the personal computing device 610 access to whatever data or resource it was requesting.

While the above descriptions have focused on only two "generations" of a computing device, such as in a single hibernate-and-resume cycle, where the operation of the computing device prior to the hibernation can be considered one "generation", and the operation of the computing device after resuming from the hibernation can be considered another, subsequent, "generation", the above descriptions are not so limited. To the contrary, the use of the monotonic counter 156 can enable the above-described mechanisms to be implemented across multiple "generations" of a computing device. As utilized herein, the term "generation" means the operation of a computing device commencing with a power-on event, including power-on events following a period during which the computing device was completely powered off, power-on events that occur as part of a restart and power-on events that cause a computing device to resume from a hibernate state, and concluding with a power-down event, including power-down events when the computing device is shut down, power-down events that occur as part of a restart and power-down events that cause a computing device to enter a hibernate state.

As described above, when the computing device 100 is being hibernated, or otherwise being placed into a suspended state that would signal the end of a current "generation", such as, for example, when a virtual computing device is reduced to a disk image for cloning, one or more entries can be logged into the event log 190. The one or more entries can include a current value of one or more of the PCRs 155, a quote of those PCR values, and a current value of the monotonic counter 156 that is being utilized as a boot counter. In embodiments where multiple generations of the computing device 100 can be recorded in the event log 190, the generations can be delineated by the values of the monotonic counter 156. More specifically, for each generation, other than the current generation, there can be a corresponding entry of a prior value of the monotonic counter 156 in the event log 190. For the current generation, the corresponding value of the monotonic counter 156 can be that of the monotonic counter 156 as maintained by it in the TPM 150.

In one embodiment, the entry, into the event log 190, comprising a then-current value of the monotonic counter 156, may not necessarily be an ultimate entry in the event log 190 prior to a power-down event. Thus, in such an embodiment, reference can be made to more traditional entries in the event log 190, such as the hardware entries 291 and 496, to determine the beginning and end of a generation of the computing device 100. The value of the monotonic counter 156 that can correspond to that generation can be the value as indicated in an entry, such as the entry 395, that appears between the entries that mark the beginning and end of that particular generation of the computing device 100.

Additionally, an analysis of an event log, such as the event log 190, that comprises entries across such multiple generations of the computing device 100 can proceed in the same manner as that described previously. In particular, a computing device analyzing the event log 190, such as the gateway computing device 620, can verify that the values of the monotonic counter 156 that are recorded in the event log 190 are continuous, indicating that there have been no generations of the computing device that have not been logged in the event log. Each of the entries in the event log can then be verified as not having been tampered with by reference to the values of the PCRs 155 that were logged in the event log 190 within the same computing device generation as the entries being verified. Additionally, those PCR values can, themselves, be verified with reference to the quote that was logged with them. Once such verifications have been performed, the entries of the event log 190, including entries stretching across multiple generations of the computing device 100, if appropriate, can be analyzed to determine whether there exist any entries referencing components that are deemed to be malicious, unsafe, or inappropriate, including, for example, components that have not been updated to a newer, improved version.

Figure 7:
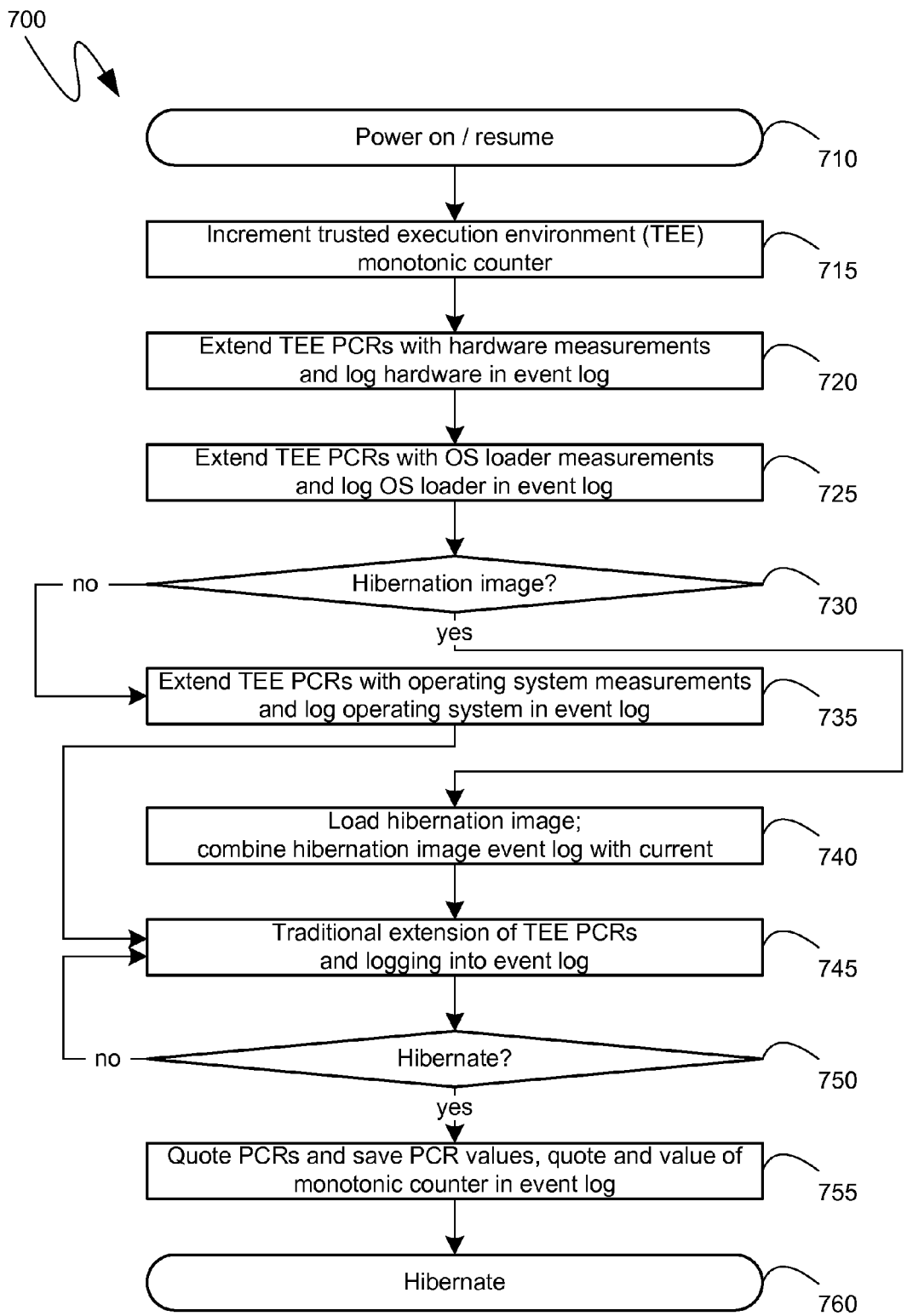
FIG. 7 is a flow diagram of an exemplary operation of a hibernation-capable computing device.

Turning to FIG. 7, the flow diagram 700 shown therein illustrates an exemplary series of steps that can be performed by a computing device generating an event log across multiple generations of a computing device, such as across multiple hibernation-and-resume cycles. Initially, as shown by the flow diagram 700 of FIG. 7, the computing device can be powered on, including as part of a resume from hibernate, at step 710. Subsequently, as early as practical, the monotonic counter of a trusted execution environment can be incremented. In the exemplary flow diagram 700 of FIG. 7, such an incrementing of the monotonic counter occurs at step 715, though it can equally be performed at a later point in time without deviating from the descriptions herein. In one embodiment, the incrementing of the monotonic counter, such as that at step 715, can be performed by computer-executable instructions that can be part of the operating system. In such an embodiment, the incrementing of the monotonic counter may not be able to be performed until after at least the relevant components of the operating system have been instantiated, such as at step 735. In another embodiment, however, the incrementing of the monotonic counter can be performed by computer-executable instructions that are part of the BIOS of the computing device 100, or even that are part of the trusted execution environment itself. In such embodiments, the incrementing of the monotonic counter can be performed substantially earlier, such as at step 715, as shown in the flow diagram 700 of FIG. 7.

In addition to the incrementing of the monotonic counter, subsequent to the power on at step 710, hardware aspects of the computing device can be instantiated, and logged in the event log, and their measurements can be utilized to extend one or more PCRs of the trusted execution environment, as shown at step 720. Similarly, at step 725, an OS loader, or other appropriate components of the operating system, can be instantiated, logged in the event log, and one or more PCRs of the trusted execution environment can be extended with their measurements.

At step 730, a determination can be made, such as by the OS loader, or other appropriate components of the operating system, as to whether a hibernation image exists. If a hibernation image does not exist, processing can proceed with step 735, at which point other components of the operating system can be instantiated to complete the booting of the operating system, with those components being logged in the event log, and their measurements being utilized to extend one or more PCRs of the trusted execution environment. Such traditional logging an extension of trusted execution environment PCRs can proceed at step 745 for other aspects of the computing device. At some point in time, as illustrated by the decision at step 750, the computing device can be hibernated. If the computing device is hibernated, or the current generation of the computing device is otherwise ended such that the information in the event log corresponding to such a generation should be saved for future evaluation, then processing can proceed to step 755 at which point the current values of the PCRs can be saved into the event log, as can the current value of the monotonic counter that was incremented at step 715. Additionally, also as part of step 755, the current values of the PCRs can be quoted, such as by being signed by one or more trusted execution environment-specific keys. The resulting quote can likewise be saved into the event log.

As in the case of the incrementing of the monotonic counter, in one embodiment the performance of step 755 can be performed by one or more components of the operating system, while, in other embodiments, the performance of step 755 can be performed by the BIOS or even the trusted execution environment itself. If the performance of step 755 is performed by components of the operating system then, as will be recognized by those skilled in the art, there may be additional steps performed after step 755, since other aspects of the computing device 100 may need to be prepared for hibernation after components of the operating system have ceased operation. However, if the performance of step 755 is performed by the BIOS or the trusted execution environment, it can occur after, for example, the operating system has been prepared for hibernation and immediately prior to the saving of the hibernation image at step 760.

Returning back to step 730, if, at step 730, it was determined that a hibernation image does exist, such as could have been created by a prior performance of step 760, then processing can proceed to step 740 at which point the hibernation image can be loaded, and the event log that was saved as part of the hibernation image can be combined with the event log that was created upon the power on at step 710. Subsequent processing can then proceed with the logging of instantiated components into the event log, and the extension of one or more PCRs with the measurements of those components.

Figure 8:
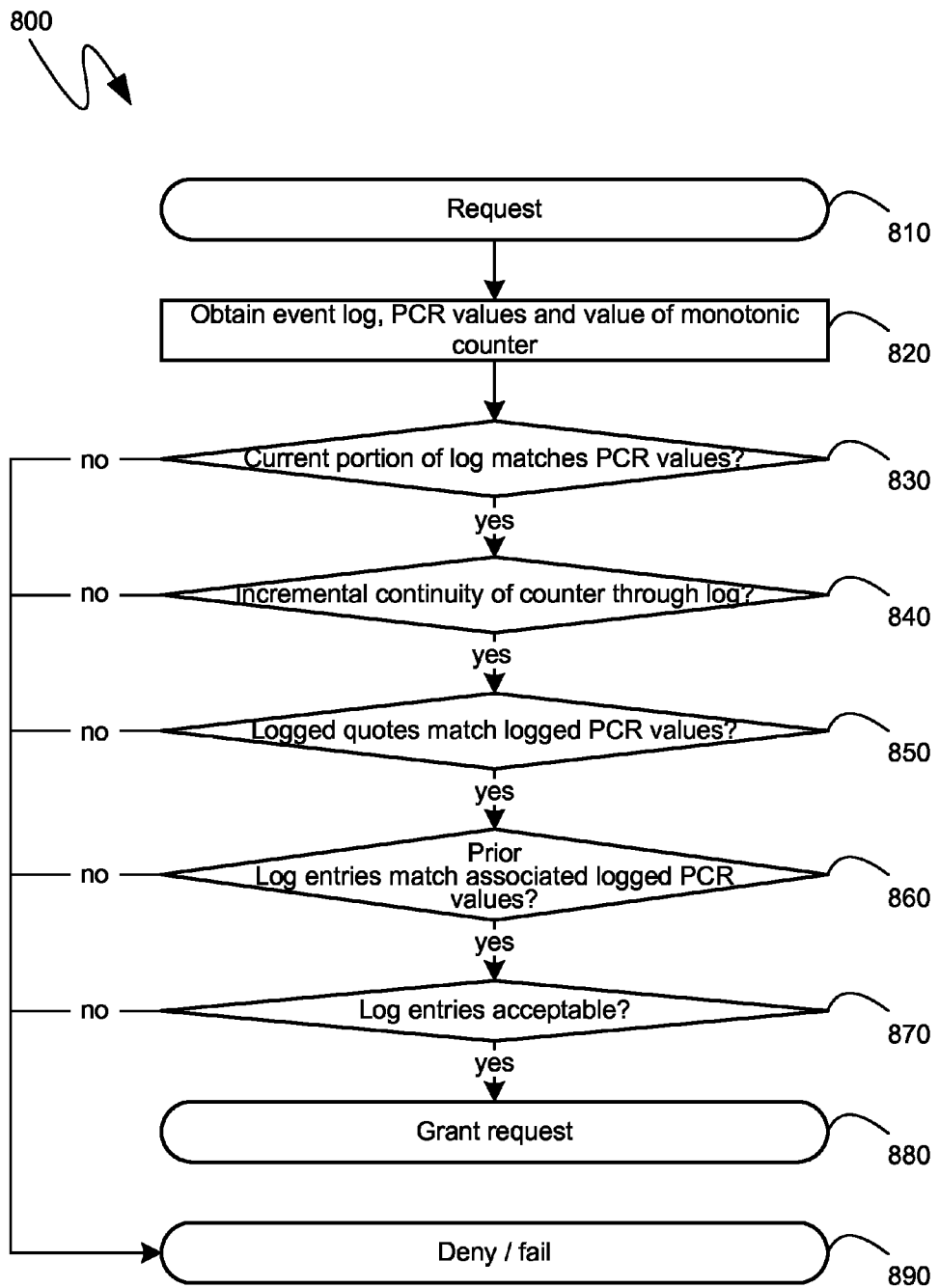
FIG. 8 is a flow diagram of an exemplary examination of an event log.

Turning to FIG. 8, the flow diagram 800 shown therein illustrates an exemplary series of steps that can be performed in determining the security state of a computing device based on an event log that was attained by that computing device. Initially, at step 810, a request, or other action that can necessitate an evaluation of a computing device's security state, can be performed. Subsequently, at step 820, the event log, the values of one or more of the PCRs and the value of the monotonic counter of the trusted execution environment of the computing device making the request at step 810, can be received. Once the relevant set of information is obtained, at step 820, a series of checks can be performed at steps 830 through 870. While the checks are illustrated in a particular order in the exemplary flow diagram 800 of FIG. 8, such an order is meant to be illustrative only and is not an indication that a certain check must be performed prior to any other particular check since, as can be seen from the exemplary flow diagram 800 of FIG. 8, the failure of any one of the checks can result, at step 890, in the denial or failure of the request that was received at step 810 and, conversely, success of each of the checks can result in the request, that was received at step 810, being granted at step 880.

One of the checks that can be performed, such as at step 830, can comprise a determination of whether a current portion of the event log, such as those event log entries from the current generation of the computing device being evaluated, match the current PCR values. As will be known by those skilled in the art, such a check can be performed by extending the measurements of the components whose entries are being verified in the same manner as they were extended into one or more PCRs, and then verifying that the obtained value matches that of actual PCRs.

Another check that can be performed, such as at step 840, can verify whether there is incremental continuity of the monotonic counter throughout the log. As indicated previously, the monotonic counter need not be incremented by an increment value of 1. In such embodiments, the check, at step 840, can verify that the values of the monotonic counter that were logged in the event log, and the current value of the monotonic counter, such as was received at step 820, differ from each other by an amount equal to a single increment value. If there is a difference between the logged values of the monotonic counter, or between the last logged value of the monotonic counter and the current value of the monotonic counter that is greater than a single increment value, such a discrepancy can indicate that the computing device was booted at least once in between the generations associated with the two values of the monotonic counter between which this discrepancy was found, and, as such, the entries in the event log no longer comprise a continuous history of the computing device.

In one embodiment, before verifying that the log entries of prior generations of the computing device match the logged PCR values associated with those generations, a preliminary check can be made to verify that the logged PCR values have not been tampered with, or otherwise modified. Thus, at step 850, a determination can be made as to whether the logged PCR values match the quote of those values that was also entered into the event log. If such a check fails, then there may not be any reason to verify that the log entries of prior generations of the computing device match the logged PCR values associated with those generations, since the logged PCR values themselves could not be verified.

However, if, at step 850, the logged PCR values were verified with reference to the quote of those values that was also logged, then processing can proceed to step 860, where it can be determined whether the log entries of prior generations of the computing device match the logged PCR values associated with those generations. As in the case of the check at step 830, such a determination can be performed by extending the measurements of the components of those prior generational entries that are being verified in the same manner as they would have been extended into one or more PCRs, and then verifying that the obtained value matches that of the associated logged PCR values.

As a final check, once all of the entries in the event log can have been verified, such as via the checks described above, to be authentic, and not tampered with or otherwise modified, the log entries themselves can be evaluated, as such at step 870, to determine whether they indicate that the security state of the computing device may have been compromised. Thus, for example, the log entries can be examined to identify any potentially malicious components, or any components that represent older, less secure versions, or that represent components that are simply deemed to constitute a security risk, or are otherwise unacceptable. If all such checks are passed, then, at step 880, the request that was received at step 810 can be granted. Conversely, if any of the checks fail, then, at step 890, the request can be denied, or can otherwise fail.

As can be seen, mechanisms for securely logging events across multiple generations of a computing device have been presented. In view of the many possible variations of the subject matter described herein, we claim as our invention all such embodiments as may come within the scope of the following claims and equivalents thereto.

We claim:

1. One or more computer-readable storage devices comprising computer-executable instructions for evaluating a log file of a computing device, the log file comprising entries from a current generation of the computing device and at least one prior generation of the computing device, the computer-executable instructions, when executed by an evaluation computing device, cause the evaluation computing device to perform steps comprising:

obtaining: the log file of the computing device, a current value of one or more Platform Configuration Registers (PCRs) of a trusted execution environment of the computing device and a current value of a monotonic counter of the trusted execution environment of the computing device;

verifying incremental continuity between the current value of the monotonic counter and at least one prior value of the monotonic counter as logged in the log file, the incremental continuity being verified if a difference between the current value of the monotonic counter and the at least one prior value of the monotonic counter is not greater than a single increment value, wherein the current value of the monotonic counter is greater than the at least one prior value of the monotonic counter as logged in the log file due to the computing device having commenced the current generation subsequent to the prior generation;

verifying entries in the log file corresponding to the current generation of the computing device with reference to the current value of the one or more PCRs of the trusted execution environment of the computing device;

verifying entries in the log file corresponding to the at least one prior generation of the computing device with reference to prior values of the one or more PCRs of the trusted execution environment of the computing device that are logged in the log file and that correspond to the at least one prior generation of the computing device; and verifying the prior values of the one or more PCRs of the trusted execution environment of the computing device that are logged in the log file with reference to at least one quote of those prior values that is also logged in the log file.

2. The computer-readable storage devices of claim 1, comprising further computer-executable instructions for granting a request of the computing device if all components logged in the log file, across both the current generation of the computing device and the at least one prior generation of the computing device, are acceptable.

3. The computer-readable storage devices of claim 1, comprising further computer-executable instructions for denying a request of the computing device if at least one component logged in the log file, either as part of the current generation of the computing device or as part of the at least one prior generation of the computing device, is not acceptable.

4. The computer-readable storage devices of claim 1, comprising further computer-executable instructions for denying a request of the computing device if any of the verifying actions fail.

5. The computer-readable storage devices of claim 1, comprising further computer-executable instructions for verifying incremental continuity among all prior values of the monotonic counter as logged in the log file, wherein the log file comprises entries from multiple prior generations of the computing device.

6. The computer-readable storage devices of claim 1, wherein the computing device whose log file is being evaluated is the evaluation computing device.

7. The one or more computer-readable storage devices of claim 1, comprising further computer-executable instructions for:
incrementing the monotonic counter in response to the computing device having commenced a new generation;
generating a quote of a value of at least one PCR of the trusted execution environment prior to the computing device ending the current generation; and
inserting the quote, the value of the at least one PCR and the current value of the monotonic counter into an event log prior to the computing device ending the current generation.

8. The computer-readable storage devices of claim 7, wherein the ending the current generation comprises at least one of: entering a hibernation state or, if the computing device is a virtual computing device, saving the virtual computing device to a disk image thereof.

9. The computer-readable storage devices of claim 7, comprising further computer-executable instructions for concatenating a current event log with a prior event log from the prior generation of the computing device.

10. A system comprising:
a client computing device requesting access to a resource from a gateway computing device, the client computing device comprising a first computer-readable medium having computer-executable instructions for transmitting, to the gateway computing device, a log file of the client computing device, the log file comprising entries from a current generation of the computing device and at least one prior generation of the computing device, a current value of one or more Platform Configuration Registers (PCRs) of a trusted execution environment of the client computing device and a current value of a monotonic counter of the trusted execution environment of the client computing device; and
the gateway computing device comprising a second computer-readable medium having computer-executable instructions for performing steps comprising: verifying incremental continuity between the current value of the monotonic counter that was received from the client computing device and at least one prior value of the monotonic counter as logged in the log file that was received from the client computing device, the incremental continuity being verified if a difference between the current value of the monotonic counter and the at least one prior value of the monotonic counter is not greater than a single increment value, wherein the current value of the monotonic counter is greater than the at least one prior value of the monotonic counter as logged in the log file due to the computing device having commenced the current generation subsequent to the prior generation; verifying entries in the log file corresponding to the current generation of the computing device with reference to the current value of the one or more PCRs of the trusted execution environment of the client computing device that were received from the client computing device; verifying entries in the log file corresponding to the at least one prior generation of the client computing device with reference to prior values of the one or more PCRs of the trusted execution environment of the client computing device that are logged in the log file and that correspond to the at least one prior generation of the client computing device; and verifying the prior values of the one or more PCRs of the trusted execution environment of the client computing device that are logged in the log file with reference to at least one quote of those prior values that is also logged in the log file.

11. The system of claim 10, wherein the second computer-readable medium comprises further computer-executable instructions for granting access to the resource to the client computing device if all components logged in the log file, across both the current generation of the client computing device and the at least one prior generation of the client computing device, are acceptable.

12. The system of claim 10, wherein the second computer-readable medium comprises further computer-executable instructions for denying the client computing device access to the resource if at least one component logged in the log file, either as part of the current generation of the client computing device or as part of the at least one prior generation of the client computing device, is not acceptable.

13. The system of claim 10, wherein the second computer-readable medium comprises further computer-executable instructions for denying the client computing device access to the resource if any of the verifying actions fail.

14. The system of claim 10, wherein the second computer-readable medium comprises further computer-executable instructions for verifying incremental continuity among all prior values of the monotonic counter as logged in the log file, wherein the log file comprises entries from multiple prior generations of the client computing device.

15. The system of claim 10, wherein the first computer-readable medium comprises further computer-executable instructions for: incrementing the monotonic counter of the trusted execution environment of the client computing device in response to the client computing device having commenced a new generation; generating a quote of a value of at least one PCR of the trusted execution environment of the client computing device prior to the client computing device ending a current generation; inserting the quote, the value of the at least one PCR and the current value of the monotonic counter into an event log when the client computing device is ending the current generation.

16. The system of claim 15, wherein the ending the current generation comprises at least one of: entering a hibernation state or, if the computing device is a virtual computing device, saving the virtual computing device to a disk image thereof.

17. The system of claim 15, comprising further computer-executable instructions for concatenating a current event log with a prior event log from a prior generation of the client computing device.

18. The system of claim 15, wherein the event log comprises entries from at least one prior generation of the client computing device, the entries comprising a prior value of the monotonic counter associated with the at least one prior generation of the client computing device.

19. A method of evaluating, at an evaluation computing device, a log file of a computing device, the log file comprising entries from a current generation of the computing device and at least one prior generation of the computing device, the method comprising the steps of:
obtaining, at the evaluation computing device: the log file of the computing device, a current value of one or more Platform Configuration Registers (PCRs) of a trusted execution environment of the computing device and a current value of a monotonic counter of the trusted execution environment of the computing device;

verifying, at the evaluation computing device, incremental continuity between the current value of the monotonic counter and at least one prior value of the monotonic counter as logged in the log file, the incremental continuity being verified if a difference between the current value of the monotonic counter and the at least one prior value of the monotonic counter is not greater than a single increment value, wherein the current value of the monotonic counter is greater than the at least one prior value of the monotonic counter as logged in the log file due to the computing device having commenced the current generation subsequent to the prior generation;

verifying, at the evaluation computing device, entries in the log file corresponding to the current generation of the computing device with reference to the current value of the one or more PCRs of the trusted execution environment of the computing device;

verifying, at the evaluation computing device, entries in the log file corresponding to the at least one prior generation of the computing device with reference to prior values of the one or more PCRs of the trusted execution environment of the computing device that are logged in the log file and that correspond to the at least one prior generation of the computing device; and verifying, at the evaluation computing device, the prior values of the one or more PCRs of the trusted execution environment of the computing device that are logged in the log file with reference to at least one quote of those prior values that is also logged in the log file.

20. The method of claim 19, wherein the computing device whose log file is being evaluated is the evaluation computing device.

* * * * *